(12) United States Patent
Murai

(10) Patent No.: US 11,670,806 B2
(45) Date of Patent: Jun. 6, 2023

(54) BATTERY MANAGEMENT APPARATUS

(71) Applicant: Honda Motor Co., Ltd., Tokyo (JP)

(72) Inventor: Yu Murai, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 262 days.

(21) Appl. No.: 17/028,991

(22) Filed: Sep. 22, 2020

(65) Prior Publication Data

US 2021/0091417 A1 Mar. 25, 2021

(30) Foreign Application Priority Data

Sep. 24, 2019 (JP) .............................. JP2019-172494

(51) Int. Cl.
*H01M 10/42* (2006.01)
(52) U.S. Cl.
CPC .. *H01M 10/425* (2013.01); *H01M 2010/4271* (2013.01); *H01M 2010/4278* (2013.01)
(58) Field of Classification Search
CPC ....... H01M 10/425; H01M 2010/4271; H01M 2010/4278
See application file for complete search history.

(56) References Cited

U.S. PATENT DOCUMENTS

| 2006/0214508 | A1* | 9/2006 | Binder | H02J 7/0031 |
| | | | | 340/455 |
| 2010/0188039 | A1* | 7/2010 | Yamauchi | H01M 10/54 |
| | | | | 320/106 |
| 2013/0029192 | A1* | 1/2013 | Oya | H01M 10/425 |
| | | | | 429/61 |
| 2019/0190054 | A1* | 6/2019 | Komiyama | H01M 10/0525 |
| 2019/0250206 | A1* | 8/2019 | Noguchi | G06Q 10/20 |

FOREIGN PATENT DOCUMENTS

| JP | 2007141464 A | | 6/2007 |
| JP | 2010172142 A | | 8/2010 |
| JP | 2012155981 A | | 8/2012 |
| JP | 2020100184 A | * | 7/2020 |
| KR | 20120102460 A | * | 9/2012 |
| WO | 2012026574 A1 | | 3/2012 |
| WO | 2018147047 A1 | | 8/2018 |

OTHER PUBLICATIONS

Machine Translation of KR 20120102460 A (Year: 2022).*
Machine Translation of JP 2020100184 A (Year: 2022).*
Japanese office action; Application 2019-172494; dated Mar. 15, 2022.
Japanese Office action; Application 2019-172494; dated Aug. 23, 2022.

* cited by examiner

*Primary Examiner* — Matthew J Merkling
(74) *Attorney, Agent, or Firm* — Duft & Bornsen, PC

(57) ABSTRACT

A battery management apparatus configured to manage a battery to be reused, including an electronic control unit including a microprocessor and a memory connected to the microprocessor. The microprocessor is configured to perform acquiring a battery information including an information on a failure and repair history of the battery before the battery is reused, the memory is configured to store the battery information, and the microprocessor is configured to further perform determining a restriction imposed on the battery when the battery is reused, based on the battery information stored in the memory.

10 Claims, 4 Drawing Sheets

//BATTERY MANAGEMENT APPARATUS

CROSS-REFERENCE TO RELATED APPLICATION

This application is based upon and claims the benefit of priority from Japanese Patent Application No. 2019-172494 filed on Sep. 24, 2019, the content of which is incorporated herein by reference.

BACKGROUND OF THE INVENTION

Field of the Invention

This invention relates to a battery management apparatus configured to manage a battery to be reused.

Description of the Related Art

Conventionally, as a device of this type, there has been a known apparatus in which information of a battery mounted on a moving body and being primarily used is acquired by a management server, and when the battery is reused by a user, the management server informs the user of the battery information. Such an apparatus is described, for example, in Japanese Unexamined Patent Publication No. 2012-155981 (JP2012-155981A). In the apparatus described in JP2012-155981A, information such as past use status and use history of the battery is transmitted to the user as battery information.

However, as in the device described in JP2012-155981A, it is difficult to serve the battery for reuse in an appropriate manner only by informing the user of information such as the past use conditions and history.

SUMMARY OF THE INVENTION

An aspect of the present invention is a battery management apparatus configured to manage a battery to be reused, including an electronic control unit including a microprocessor and a memory connected to the microprocessor. The microprocessor is configured to perform acquiring a battery information including an information on a failure and repair history of the battery before the battery is reused, the memory is configured to store the battery information, and the microprocessor is configured to further perform determining a restriction imposed on the battery when the battery is reused, based on the battery information stored in the memory.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 5. A battery management apparatus according to the embodiment of the present invention is configured to manage a used battery (secondary battery) served as a secondary use (second-life use) after a primary use, i.e., for reuse. Hereafter, an example of a battery management apparatus will be described using a battery used primarily in a vehicle including a travel motor, such as an electric vehicle or hybrid vehicle.

Figure 1:
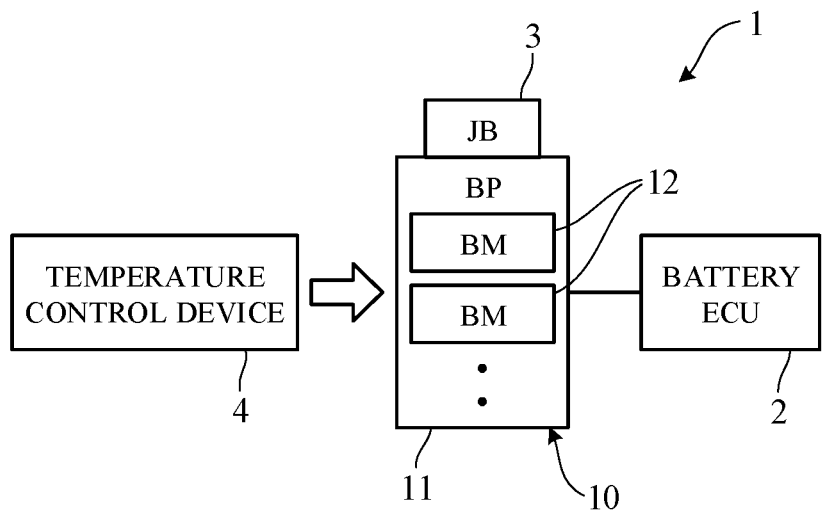
FIG. 1 is a diagram schematically showing a configuration of a battery as an object to which a battery management apparatus according to an embodiment of the invention is applied.

FIG. 1 is a diagram schematically showing the configuration of a battery 1 as an object to which the battery management apparatus according to the present embodiment is applied. The battery 1 is mounted on an electrically driven vehicle and mainly used for supplying electric power to the travel motor. As shown in FIG. 1, the battery (battery apparatus) 1 includes a battery body 10, battery ECU 2, junction board (JB) 3 and temperature control device 4. Strictly speaking, the temperature control device 4 is an appendage of the battery 1 not part of the battery 1.

The battery body 10 is configured as a unit by a single battery pack (BP) 11. The battery body 10 may be configured by multiple battery packs 11. The battery pack 11 includes multiple battery modules (BM) 12 connected with each other in series or in parallel through a bus bar or the like. These battery modules 12 each include multiple cells. Each cell is, for example, a flat lithium-ion cell sealed by a laminate film and includes electrode plates. The cells are housed in the sealed housing of the battery module 12 so as to connect the electrode plates in series or in parallel, forming a lithium-ion battery.

The battery 1 has an identification ID (battery ID) assigned for identifying the battery 1. The battery body 10, battery pack 11, battery modules 12 and cells also have identification IDs corresponding to the battery ID. Battery elements included in the battery 1 are identified by using identification IDs assigned.

The battery ECU 2 includes a CPU (microprocessor), memory such as ROM or RAM, and other peripheral circuits, and a function for monitoring a state of the battery body 10. More specifically, the battery ECU 2 includes detection circuits that detect respective states of the battery modules 12 and a detection circuit that detects a state of the battery pack 11. These detection circuits each include sensors that detect the physical quantities, such as the current, voltage, and temperature, of the battery module 12, for example. The battery ECU 2 calculate a SOC (state of charge) and a SOH (state of health) of the respective battery modules 12, and a SOC and a SOH of the battery pack 11, on the basis of the physical quantities detected by the detection circuits. The battery ECU 2 also functions as a control apparatus for controlling charging and discharging of the battery body 10.

Junction board 3 has a function of switching the connection and shutoff between the battery body 10 and a load (such as a travel motor) or a charger (not shown). The junction board 3 includes a switch such as a contactor and constitutes a switch unit. Opening and closing of the switch of the junction board 3 is controlled by the battery ECU 2, thereby controlling the charging and discharging of the battery body 10.

The temperature control device 4 is a device for adjusting the temperature of the battery body 10 by heating or cooling the battery body 10, and although not shown, for example, includes a temperature control ECU, a PTC (Positive Temperature Coefficient) heater and a cooling fan. The temperature control ECU controls the PTC heater and the cooling fan so that the temperature of the battery body 10 falls within a predetermined range in accordance with the temperature of the battery body 10 detected by the battery ECU 2. That is, the temperature of the battery body 10 is raised by driving the PTC heater, and the temperature of the battery body 10 is lowered by driving the cooling fan.

Figure 2:
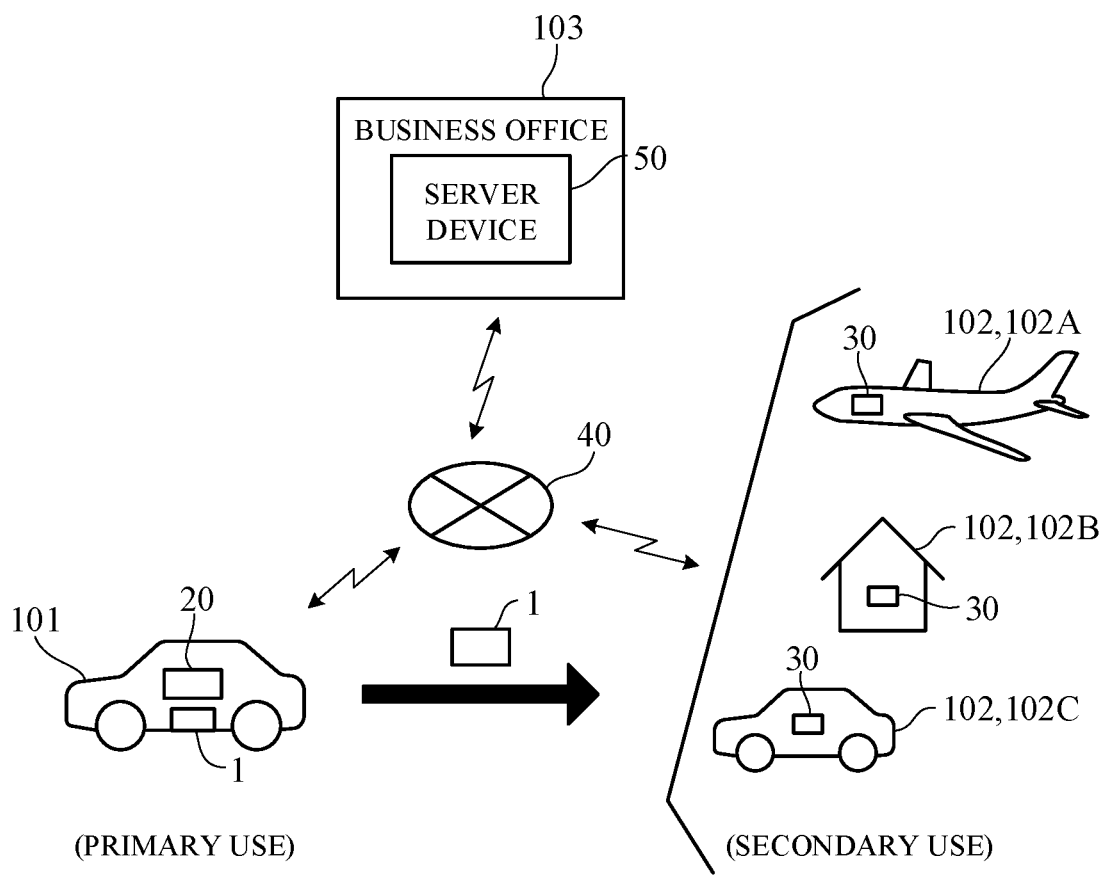
FIG. 2 is a block diagram schematically showing an overall configuration of a battery management system including the battery management apparatus according to the embodiment of the present invention.

FIG. 2 is a block diagram schematically showing an overall configuration of a battery management system 100 having the battery management apparatus according to the present embodiment. As shown in FIG. 2, the battery management system 100 includes a vehicle terminal 20 mounted on a vehicle 101 for primary use of the battery 1, an object terminal 30 mounted on an object 102 for secondary use of the battery 1, and a server device 50 provided at a business office 103 that performs business such as an intermediation of transfer of the battery 1 from the vehicle 101 to the object 102 and an attachment and detachment work of the battery 1.

The server device 50 may be provided in a place other than the business office 103. The transfer of the battery 1 from the vehicle 101 to the object 102 may be performed without through the business office 103. Various objects such as an aircraft 102A, house 102B and vehicle 102C are included in the object 102 in which the battery 1 is served as secondary use.

As shown in FIG. 2, the vehicle terminal 20, object terminal 30, and server device 50 are connected to a network 40, such as a public wireless communication network typified by the Internet network or mobile telephone network, and are able to communicate with each other through the network 40. Examples of the network 40 also include closed communication networks provided for predetermined control areas, for example, wireless LANs, Wi-Fi (registered trademark), and the like.

The vehicle terminal 20 includes, as a functional configuration, a communication unit for communicating through the network 40. The vehicle terminal 20 transmits a vehicle information of each vehicle 101 and an information (a battery information) of the battery 1 mounted on the each vehicle 101 together with the vehicle ID for identifying the vehicle 101 and the battery ID for identifying the battery 1 through the communication unit at a predetermined timing. The vehicle information includes information on a vehicle type, model year, driving distance, registered address, and the like of the vehicle 101, as well as information on end time of the primary use of the battery 1. For example, when the vehicle 101 is discarded, the discarded vehicle time is the end time of the primary use.

The battery information includes information of failure history of the battery 1 and information of repair history (failure repair information). The vehicle terminal 20 recognizes a presence or absence of failure of the battery 1, the details of the failure, a presence or absence of repair of the battery 1, and the details of the repair based on the signals from the battery ECU 2 or the like. Further, the vehicle terminal 20 transmits the failure repair information together with the battery ID to the server device 50 each time the failure occurs and each time a repair or replacement of a component coping with the failure is performed. The failure repair information includes failure repair information for each of the battery body 10, battery ECU 2, junction board 3 and temperature control device 4.

The failure repair information of the battery body 10 is, for example, information on an occurrence of failure of the battery pack 11 and battery module 12, and information on a repair and replacement of the battery pack 11 and battery module 12 to cope with the failure. The replacement of the battery module 12 includes the case of replacing all of the plurality of battery modules 12, and the case of replacing only a part of the plurality of battery modules 12. When the battery pack 11 or the battery module 12 is replaced, a replacement time and an identification ID of the replaced component are transmitted to the server device 50 as the failure repair information.

The failure repair information of the battery ECU 2 is information on an occurrence of failure of the battery ECU 2, and information on a repair and replacement of the battery ECU 2 to cope with the failure, and further information on a rewriting of various data (programs, etc.) stored in the battery ECU 2. When the data stored in the battery ECU 2 is rewritten, information (e.g., past failure repair information) stored in the battery ECU 2 is transmitted to the server device 50 and stored in the server device 50 before rewriting.

The failure repair information of the junction board 3 is information on a failure of the junction board 3, and information on a replacement of a whole of the junction board 3 or a repair and exchange of parts such as contacts in the junction board 3 to cope with the failure. The failure repair information of the temperature control device 4 is information on an occurrence of failure of any of the temperature control ECU, the PTC heater and the cooling fan, and information on a repair and replacement of these parts to cope with the failure.

The battery information further includes information that affects a performance of the battery 1, for example, the information on a charging time of the battery 1, a discharging time, an amount of charge, an amount of discharge, a frequency of charging and discharging, and a use environment (temperature, etc.) in which the battery 1 is placed, and information on the SOH representing a degree of deterioration of the battery 1.

The object terminal 30 includes, as a functional configuration, a communication unit for communicating through the network 40. The object terminal 30 transmits a requirement to be satisfied by the battery 1 mounted on each object 102, that is, a requirement information which is information for the battery 1 required by the object terminal 30, together with the object ID for identifying the object 102. The requirement information includes information on such as a shape, voltage and capacity of the battery 1 for the secondary use, and a value of reliability required for the battery 1 (a required reliability). Information on the usage mode such as a working temperature and a frequency of use of the battery 1 in the secondary use is also included in the requirement information.

The reliability of the battery 1 becomes higher as there is less failure history or repair history, and as a variation of the SOH between the plurality of battery modules 12 in the battery pack 11 is smaller. The required reliability for the battery 1 is determined according to a type of the object 102 and a mode of use of the object 102. For example, the required reliability of the aircraft 102A is higher than the required reliability of the house 102B or the vehicle 102C.

The battery management apparatus according to the present embodiment is mainly configured by the server device 50. The server device 50 is formed, for example, as a single server or as distributed servers consisting of servers having different functions. The server device 50 may be formed as distributed virtual servers created in the cloud environment, which are called cloud servers. The server device 50 includes an arithmetic processing unit including a CPU (microprocessor), memory such as ROM or RAM, and other peripheral circuits.

Figure 3:
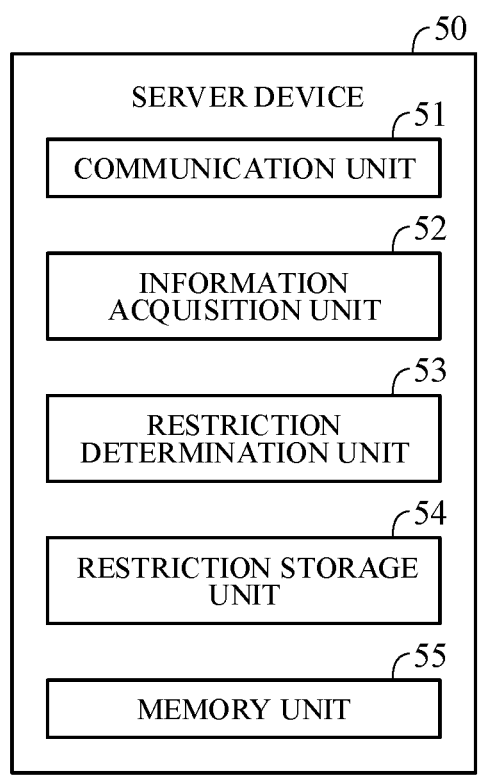
FIG. 3 is a block diagram showing a functional configuration of a server device of FIG. 2.

FIG. 3 is a block diagram showing a functional configuration of the server device 50. As shown in FIG. 3, the server device 50 includes, as a functional configuration, a communication unit 51, an information acquisition unit 52, a restriction determination unit 53, a restriction storage unit 54 and a memory unit 55.

The communication unit 51 is configured to be able to wirelessly communicate with the vehicle terminal 20 and the object terminal 30 through the network 40. The communication unit 51 communicates with the vehicle terminal 20 and the object terminal 30 in a predetermined cycle or at a predetermined timing, and receives and transmits various types of information therefrom and thereto.

The information acquisition unit 52 acquires a battery information and a vehicle information transmitted from the vehicle terminal 20 along with battery ID and vehicle ID corresponding to each information. In the acquired battery information, a failure repair information of each battery 1 is included. Further, the information acquisition unit 52 acquires a requirement information transmitted from the object terminal 30 along with object ID corresponding to the requirement information. In the acquired requirement information, a reliability information required for the battery 1 served as a secondary use is included. The various information acquired by the information acquisition unit 52 is stored in the memory unit 55.

The restriction determination unit 53 determines a restriction imposed when each battery 1 is secondarily used (reused), based on the battery information (failure repair information) stored in the memory unit 55. In this connection, if a failure occurs in the battery 1, even after its repair, there is a possibility that the battery performance is inferior to that of the battery 1 in which no failure has occurred, and thus the reliability with respect to the battery 1 is reduced. With this in mind, a certain restriction imposed on such a battery 1 is determined. The predetermined restriction is determined in accordance with the correspondence relationship stored in advance in the memory unit 55, according to a portion and a content of the failure and a portion and a content of the repair.

For example, when the battery pack 11 or the battery module 12 is repaired due to variations in the SOC or SOH of the plurality of battery modules 12 during the primary use of the battery 1, as a restriction on the battery 1, the secondary use in a manner in which the influence of the magnitude of the variation is large is prohibited. Specifically, it imposes a restriction that prohibits the use of the plurality of battery modules 12 in parallel connection.

Further, when the temperature control device 4 is repaired during the primary use of the battery 1, since the reliability to the function of the temperature adjustment is low, it imposes a restriction that prohibits the secondary use in areas with a large temperature gap between cold and hot where the temperature adjustment is frequently required. Furthermore, when the switches in the junction board 3 are repaired during the primary use of the battery 1, since the switches are likely to malfunction due to vibration, it imposes a restriction that prohibits the secondary use for the object 102 which may vibrate violently.

Further, the restriction determination unit 53 calculates reliability of each battery 1 based on the failure repair information of each battery 1 stored in the memory unit 55. The reliability is a value representing the reliability of the battery information, for example, the higher the number of failure history or repair history of the battery 1, and the greater the variation in the SOH between the plurality of battery modules 12 in the battery pack 11, a lower value. Then, the restriction determination unit 53 imposes, as a restriction, that the calculated reliability (value of reliability) is equal to or higher than a required reliability included in the requirement information.

The restriction storage unit 54 stores and keeps the restriction determined by the restriction determination unit 53 in, for example, the memory unit 55. The restriction held by the restriction storage unit 54 is transmitted to the object terminal 30 of the object 102 that starts the secondary use of the battery 1. As a result, the user of the object 102 can accurately determine whether or not the battery 1 can be secondarily used. The restriction storage unit 54 may be included in the memory unit 55, and the memory unit 55 may store and keep the restriction determined by the restriction determination unit 53.

Before the battery 1 is secondarily used, under the predetermined restriction determined by the restriction determination unit 53, a determination unit (not shown) of the server device 50 may determine whether or not the battery 1 satisfies various requirements (shape, reliability, etc.) included in the requirement information transmitted from the object terminal 30, and the determination result may be transmitted from the server device 50 to the object terminal 30. This makes it easy to determine whether or not the battery 1 can be secondarily used for the object 102.

Figure 4:
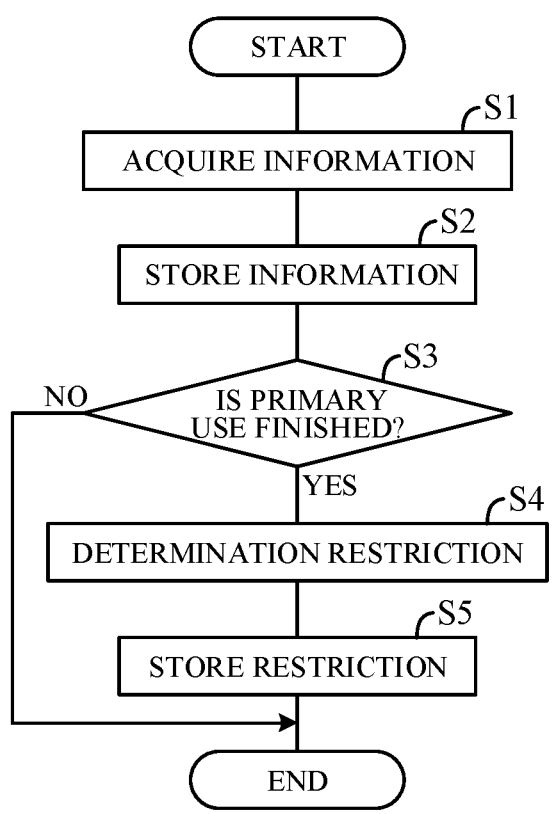
FIG. 4 is a flowchart showing an example of a processing performed by a CPU of the server device of FIG. 3.

FIG. 4 is a flowchart showing an example of a processing performed by the CPU of the server device 50 in accordance with a predetermined program. The processing shown in this flowchart is mainly performed by the information acquisition unit 52, the restriction determination unit 53 and the restriction storage unit 54. This processing is started when the primary use of the battery 1 is begun, and repeated at a predetermined cycle until the secondary use of the battery 1 is begun.

First, in S1 (S: processing step), the server device 50 (CPU) acquires the battery information including the failure repair information of each battery 1 and the vehicle information from the vehicle terminal 20. Next, in S2, the server device 50 stores the battery information and the vehicle information acquired in S1 along with corresponding battery ID and vehicle ID in the memory unit 55. Next, in S3, the server device 50 determines whether or not the primary use of the battery 1 is finished based on the vehicle information acquired in S1. For example, when a procedure for discarding the vehicle 101 is started, it is determined that the primary use has been finished. If the determination in S3 is YES, the processing proceeds to S4. On the other hand, if the determination in S3 is NO, the processing ends.

In S4, the server device 50 determines the restriction imposed when the battery 1 is secondarily used, based on the failure repair information stored in S2. Next, in S5, the server device 50 stores (keeps) the restriction determined in S4 in the memory unit 55, and ends the processing. The restriction stored in S5, such as when there is a request from the object terminal 30, is transmitted to the object terminal 30 via the communication unit 51.

The operation of the battery management apparatus according to the present embodiment is summarized as follows. When a failure such as a variation in SOH of a plurality of battery modules 12 occurs in the battery 1 mounted on the vehicle 101 and used primarily, and repair or replacement of parts is performed for the failure, the failure repair information is transmitted from the vehicle terminal 20 to the server device 50 and stored in the memory unit 55 (S1, S2). Thereafter, when the primary use of the battery 1 is finished, such as by the vehicle 101 is scrapped, the battery 1 is removed from the vehicle 101 and used for secondary use (reused).

At this time, the restriction is imposed on the battery 1 based on the failure repair information obtained during the primary use (S4, S5). For example, the reliability of the battery 1 is calculated, and the battery 1 having a reliability lower than the required reliability of the object 102 (e.g., the aircraft 102A) is prohibited from being used for the object 102. Specifically, in accordance with the failure repair information, it is prohibited that the battery modules 12 are secondarily used in parallel connection, or that the battery 1 is secondarily used in a predetermined environment (e.g., a high temperature environment, an environment where vibration is severe, etc.). As a result, the battery 1 can be used for secondary use in an optimal manner.

The present embodiment can achieve advantages and effects such as the following:

(1) A battery management apparatus (server device 50) is configured to manage a battery 1 to be secondarily used (reused). The battery management apparatus includes an information acquisition unit (battery information acquisition unit) 52 acquiring a battery information including an information on a failure and repair history of the battery a before the battery 1 is secondarily used, a memory unit 55 storing the battery information acquired by the information acquisition unit 52, and a restriction determination unit 53 determining a restriction imposed on the battery 1 when the battery is secondarily used, based on the battery information stored in the memory unit 55 (FIG. 3).

Therefore, the battery 1 can be served for secondary use in an appropriate manner. That is, if there is a history of failure or repair in the battery 1, since the reliability with respect to the battery 1 is reduced, it is necessary to impose a restriction on the secondary use of the battery 1. According to the present embodiment, an appropriate restriction according to a failure or repair content can be imposed on the battery 1, and thus it is possible to provide the battery 1 to the secondary use with confidence.

(2) The battery 1 includes a battery body 10 including a plurality of battery elements such as modules 12 and cells, connected with each other in series or parallel, a battery ECU 2 monitoring a state of the battery body 10, and a junction board 3 (switch unit) connected to the battery body 10 (FIG. 1). The battery information includes an information on any of a repair or replacement of the battery body 10, a repair or replacement of the junction board 3, a repair of replacement of the battery ECU 2, a rewrite of a data stored in the battery ECU 2, and a repair or replacement of a temperature control device 4 heating or cooling the battery body 10. Thus, appropriate restricts corresponding to various repairs and failures of the battery 1 can be imposed in the secondary use of the battery 1.

(3) Before the data stored in the battery ECU 2 is rewritten, the memory unit 55 stores the data of the battery ECU 2. As a result, even if the data (e.g., programs) of the battery ECU 2 is rewritten when a failure repair information or the like is temporarily stored in the battery ECU 2, the failure repair information can be reliably stored in the server device 50 without being lost.

(4) The memory unit 55 stores a repair information on a repaired portion and a repair content of the battery 1 as a failure repair information before the battery 1 is secondarily used. The restriction determination unit 53 determines the restriction imposed on the battery 1 when the battery 1 is secondarily used, in accordance with the repair information stored in the memory unit 55. As a result, it is possible to appropriately determine restrictions on the battery 1 at the time of secondary use in accordance with the repair mode.

Various modifications of the above embodiment are possible. Some examples are explained in the following. In the above embodiment, the battery 1 the battery 1 includes the battery body 10, the battery ECU 2 and the junction board 3, and further the temperature control device 4 is provided as an appendage of the battery 1. However, the configurations of the battery 1 and the appendage are not limited to this. In the above embodiment, the lithium-ion battery is used as a battery for secondary use. However, even when other battery (secondary battery) is used, the present invention can be similarly applied.

In the above embodiment, the information acquisition unit 52 as a battery information acquisition unit acquires a repair history information included in the battery information, but the repair history information is not limited to the above-described one. That is, the repair history information includes information on the repair history of various products and parts that affect the performance (reliability, etc.) of the battery 1, specifically includes information on not only the repair history of the battery 1 itself but also the repair history of the appendages of the battery 1, but the appendages of the battery 1 in this case may be other than the temperature control device 4. If there is a repair history of a case housing the battery 1 or parts around the battery 1, the reliability of the battery 1 may be reduced due to an impact on the battery 1. Thus, such an information may also be included in the repair history information that affects the performance of the battery.

In the above embodiment, the battery 1 (battery information, etc.) is managed by the server device 50, but it may be managed by the vehicle terminal 20. In this case, the object terminal 30 may receive the information from the vehicle terminal 20 and judge whether or not the secondary use of the battery 1 is appropriate.

Figure 5:
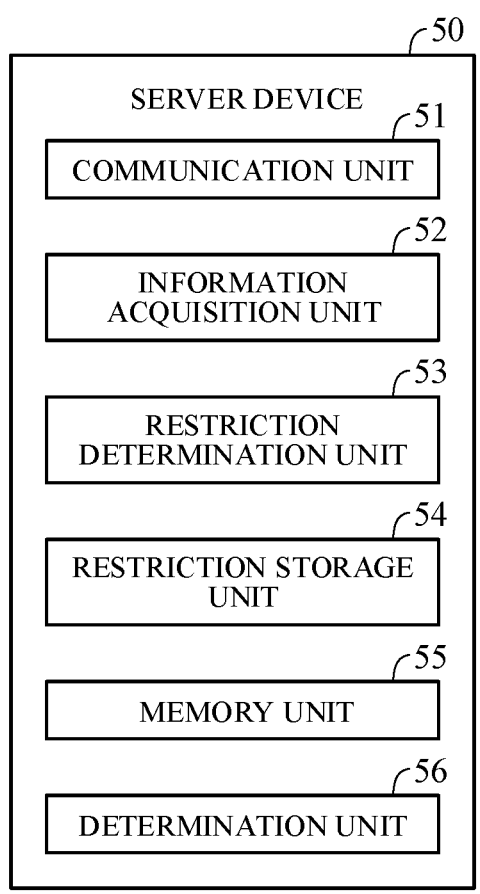
FIG. 5 is a block diagram showing a modification of FIG. 3.

In the above embodiment, the restriction determined by the restriction determination unit 53 and stored in the memory unit 55 is transmitted to the object terminal 30 via the communication unit 51 when a requirement from the object terminal 30 is received. That is, although the server device transmits the information of the restriction to the object terminal 30, instead, the server device 50 may receive the requirement information from the object terminal 30. FIG. 5 is a block diagram showing an example of a modification of FIG. 3.

As shown in FIG. 3, the server device 50 further includes a determination unit 56. Before the battery 1 is secondarily used, the determination unit 56 determines whether or not the battery 1 satisfies various requirements (shape, reliability, etc.) included in a requirement information transmitted from the object terminal 30 under a predetermined restriction determined by the restriction determination unit 53. The server device 50 transmits the determination result to the object terminal 30 via the communication unit 51. As a result, it is possible to easily determine whether or not the battery 1 can be secondarily used for the object 102.

The present invention can be configured as a battery management method configured to manage a battery 1 to be secondarily used (reused), including: acquiring a battery information including an information on a failure and repair history of the battery 1 before the battery 1 is reused, storing the battery information acquired; and determining a restriction imposed on the battery 1 when the battery 1 is reused, based on the battery information stored.

The above embodiment can be combined as desired with one or more of the above modifications. The modifications can also be combined with one another.

According to the present invention, since a restriction imposed on a battery when the battery is reused is determined based on a battery information including an information on a failure and repair history of the battery, it is possible to provide the battery for a secondary use in an appropriate manner.

Above, while the present invention has been described with reference to the preferred embodiments thereof, it will be understood, by those skilled in the art, that various changes and modifications may be made thereto without departing from the scope of the appended claims.

What is claimed is:

1. A battery management apparatus configured to manage a battery to be reused, comprising:
   an electronic control unit including a microprocessor and a memory connected to the microprocessor, wherein
   the microprocessor is configured to perform acquiring battery information including a history of a failure of the battery and a repair of the battery to cope with the failure before the battery is reused,
   the memory is configured to store the battery information,
   the microprocessor is configured to further perform determining a restriction imposed on the battery when the battery is reused, based on the battery information stored in the memory,
   the battery information includes a repaired portion and a repair content of the battery as the history of the repair of the battery, and
   the microprocessor is configured to further perform storing the battery information into the memory before the battery is reused, and wherein
   the microprocessor is configured to perform
   the determining including determining the restriction in accordance with the repaired portion and the repair content of the battery included in the battery information.

2. The battery management apparatus according to claim 1, wherein
   the battery includes:
     a battery body including a plurality of battery elements connected with each other in series or parallel;
     a battery control unit configured to monitor a state of the battery body; and
     a switch unit connected to the battery body,
   the battery information is transmitted by a vehicle terminal mounted on a vehicle on which the battery is mounted,
   the microprocessor is configured to perform the acquiring including acquiring the battery information transmitted by the vehicle terminal, and
   the battery information includes any of a repair or replacement of the battery body, a repair or replacement of the switch unit, a repair of replacement of the battery control unit, a rewrite of data stored in the battery control unit, and a repair or replacement of a temperature control device configured to heat or cool the battery body.

3. The battery management apparatus according to claim 2, wherein
   when the rewrite of the data stored in the battery control unit is performed, the data is transmitted by the vehicle terminal before the rewrite of the data, and
   the microprocessor is configured to further perform storing the data transmitted by the vehicle terminal into the memory.

4. The battery management apparatus according to claim 1, wherein
   the microprocessor is configured to perform
   the determining including calculating a degree of a reliability of the battery based on the repaired portion and the repair content of the battery included in the battery information and determining the restriction in accordance with the degree of the reliability.

5. The battery management apparatus according to claim 1, wherein
   the microprocessor is configured to further perform determining whether a requirement required for the battery to be reused is satisfied under the restriction.

6. A battery management method configured to manage a battery to be reused, comprising:
   acquiring battery information including a history of a failure of the battery and a repair of the battery to cope with the failure before the battery is reused, the battery information including a repaired portion and a repair content of the battery as the history of the repair of the battery,
   storing the battery information before the battery is reused; and
   determining a restriction imposed on the battery when the battery is reused, based on the battery information stored, wherein
   the determining including determining the restriction in accordance with the repaired portion and the repair content of the battery included in the battery information.

7. The battery management apparatus according to claim 2, wherein
   the microprocessor is configured to perform
   the determining including determining the restriction to the battery for prohibiting reusing in a manner in which the plurality of battery elements of the battery is connected a predetermined connection configuration, reusing in a predetermined area, and reusing for a predetermined object.

8. The battery management apparatus according to claim 4, wherein
   the larger a number of the history of the failure and the repair of the battery, the lower the degree of the reliability is.

9. The battery management apparatus according to claim 1, wherein
   the microprocessor is configured to further perform transmitting the restriction to an object terminal mounted on an object reusing the battery.

10. The battery management apparatus according to claim 5, wherein
    the microprocessor is configured to perform
    the determining whether the requirement is satisfied under the restriction including transmitting a result of the determining to an object terminal mounted on an object reusing the battery.

* * * * *